United States Patent
Rana et al.

(10) Patent No.: US 10,740,402 B2
(45) Date of Patent: Aug. 11, 2020

(54) SYSTEM AND METHOD FOR HUMAN INTERACTION IN COGNITIVE DECISION MAKING PROCESS

(71) Applicant: Diwo, LLC, Northville, MI (US)

(72) Inventors: Satyendra Pal Rana, Northville, MI (US); Chandra Puttanna Keerthy, Northville, MI (US); Krishna Prakash Kallakuri, Northville, MI (US)

(73) Assignee: DIWO, LLC, Northville, MI (US)

( * ) Notice: Subject to any disclaimer, the term of this patent is extended or adjusted under 35 U.S.C. 154(b) by 406 days.

(21) Appl. No.: 15/788,279

(22) Filed: Oct. 19, 2017

(65) Prior Publication Data

US 2018/0114155 A1    Apr. 26, 2018

Related U.S. Application Data

(60) Provisional application No. 62/410,738, filed on Oct. 20, 2016.

(51) Int. Cl.
*G06F 16/00* (2019.01)
*G06F 16/903* (2019.01)
*G06N 5/02* (2006.01)
*G06Q 10/06* (2012.01)
*G06Q 30/02* (2012.01)
(Continued)

(52) U.S. Cl.
CPC .... *G06F 16/90335* (2019.01); *G06F 16/3325* (2019.01); *G06F 16/9535* (2019.01); *G06N 5/022* (2013.01); *G06Q 10/067* (2013.01); *G06Q 30/0201* (2013.01); *G06Q 30/0235* (2013.01)

(58) Field of Classification Search
None
See application file for complete search history.

(56) References Cited

U.S. PATENT DOCUMENTS 8,527,337 B1 * 9/2013 Lim ............ G06Q 30/00
705/14.35
8,909,771 B2 * 12/2014 Heath ............ G06Q 30/02
705/39

(Continued)

OTHER PUBLICATIONS

Karen Lewis, "Humans and systems: Creating natural interfaces to augment human ability", IBM, Nov. 2016.

*Primary Examiner* — Gurkanwaljit Singh
(74) *Attorney, Agent, or Firm* — FisherBroyles, LLP; Susan M. Oiler

(57) ABSTRACT

Disclosed is a method for displaying a strategy, pertaining to a business opportunity, during a conversation with a user. Initially, a question is received from a user. Upon receiving, a set of keywords from the question is extracted based on natural language processing techniques. Subsequently, an answer to the question is displayed along with metadata associated to the answer. The metadata is displayed based on a demographic profile of the user. Further, the user is nudged with a set of predefined questions based on the demographic profile and the set of keywords. Furthermore, a set of responses received against the set of predefined questions is analyzed to identify a business opportunity. The set of responses is analyzed based on the set of keywords and the demographic profile. In addition, a strategy pertaining to the business opportunity is displayed based on the question, the set of responses, and the demographic profile.

17 Claims, 4 Drawing Sheets

(51) Int. Cl.
*G06F 16/9535* (2019.01)
*G06F 16/332* (2019.01)

(56) References Cited

U.S. PATENT DOCUMENTS

| | | |
|---|---|---|
| 9,349,100 B2 | 5/2016 | Kozloski et al. |
| 9,471,872 B2 | 10/2016 | Anand et al. |
| 9,626,959 B2 | 4/2017 | Di Cristo et al. |
| 2002/0045154 A1 | 4/2002 | Wood |
| 2007/0192166 A1* | 8/2007 | Van Luchene .......... G06Q 30/02 705/14.54 |
| 2007/0192168 A1* | 8/2007 | Van Luchene ....... G06Q 10/047 705/14.54 |
| 2009/0150215 A1* | 6/2009 | Kalb ...................... G06Q 30/02 705/7.29 |
| 2010/0205541 A1* | 8/2010 | Rapaport ............... G06Q 10/10 715/753 |
| 2011/0258049 A1* | 10/2011 | Ramer ................... G06Q 30/02 705/14.66 |
| 2012/0179536 A1* | 7/2012 | Kalb ...................... G06Q 30/02 705/14.43 |
| 2013/0073336 A1* | 3/2013 | Heath ................... G06Q 30/02 705/7.29 |
| 2015/0036817 A1* | 2/2015 | Jain ..................... H04M 3/5175 379/266.02 |
| 2015/0242525 A1* | 8/2015 | Perlegos ............... G06F 16/972 707/782 |
| 2015/0339303 A1* | 11/2015 | Perlegos ............. G06F 16/9558 707/756 |
| 2017/0235848 A1* | 8/2017 | Van Dusen ............ G06Q 50/01 705/12 |

* cited by examiner

SYSTEM AND METHOD FOR HUMAN INTERACTION IN COGNITIVE DECISION MAKING PROCESS

CROSS REFERENCE TO RELATED APPLICATIONS

This patent application claims priority from US Provisional Application No. 62/410,738 filed on 20 Oct. 2016, the entirety of which is hereby incorporated by reference.

TECHNICAL FIELD

The present disclosure described herein, in general, relates to a human interaction system coupled with machines to facilitate ease in decision making in a cognitive framework. More particularly, the present disclosure displays a strategy, pertaining to a business opportunity, during a conversation with a user.

BACKGROUND

In our day to day life, a user heavily relies on his/her instincts before taking any business decision. Electronic machines like computer help the user to find information which might help speed up decision making. In doing so, the electronic machine has limited or no understanding of the user's manner of making decisions or user's particular goals while looking for information. Human interaction with machine is enabled through a software application hosted on the electronics machine which provides a user interface. In order to facilitate decision-making, a human interaction system is needed that understands the user, makes sense of user's utterances during interaction, and allows users to arrive at the best decision much faster than what is possible in current systems.

SUMMARY

Before the present systems and methods, are described, it is to be understood that this application is not limited to the particular systems, and methodologies described, as there can be multiple possible embodiments which are not expressly illustrated in the present disclosure. It is also to be understood that the terminology used in the description is for the purpose of describing the particular versions or embodiments only, and is not intended to limit the scope of the present application. This summary is provided to introduce concepts related to a human interaction system coupled with machines to facilitate ease in decision making and the concepts are further described below in the detailed description. This summary is not intended to identify essential features of the claimed subject matter nor is it intended for use in determining or limiting the scope of the claimed subject matter.

In one implementation, a method for displaying a strategy, pertaining to a business opportunity, during a conversation with a user is disclosed. In order to display the strategy, initially, a question may be received from the user. Upon receiving the question, a set of keywords from the question may be extracted based on natural language processing techniques. Subsequent to the extraction, an answer to the question may be displayed along with metadata associated to the answer. In one aspect, the metadata may be displayed based on a demographic profile pertaining to the user. Further, the user may be nudged with a set of predefined questions based on the demographic profile and the set of keywords. Further to nudging the user, a set of responses received against the set of predefined questions may be analyzed to identify a business opportunity. In one aspect, the set of responses may be analyzed based on the set of keywords and the demographic profile. In addition to analyzing the set of responses, a strategy pertaining to the business opportunity may be displayed. In one aspect, the strategy may be displayed based on the question, the set of responses, and the demographic profile. In another aspect, the aforementioned method for displaying a strategy, pertaining to a business opportunity, during a conversation with a user may be performed by a processor using programmed instructions stored in a memory.

In another implementation, a system for displaying a strategy, pertaining to a business opportunity, during a conversation with a user is disclosed. The system may comprise a processor and a memory coupled to the processor. The processor may execute a plurality of modules present in the memory. The plurality of modules may comprise a receiving module, an extraction module, a display module, a nudging module, and an analysis module. The data receiving module may receive a question from the user. The extraction module may extract a set of keywords from the question based on natural language processing techniques. Subsequent to the extraction, the display module may display an answer to the question along with metadata associated to the answer. In one aspect, the metadata may be displayed based on a demographic profile pertaining to the user. Further, the nudging module may nudge the user with a set of predefined questions based on the demographic profile and the set of keywords. Subsequently, the analysis module may analyze a set of responses received against the set of predefined questions to identify a business opportunity. In one aspect, the set of responses may be analyzed based on the set of keywords and the demographic profile. In addition, the display module may display a strategy pertaining to the business opportunity. In one aspect, the strategy may be displayed based on the question, the set of responses, and the demographic profile.

In yet another implementation, non-transitory computer readable medium embodying a program executable in a computing device for displaying a strategy, pertaining to a business opportunity, during a conversation with a user is disclosed. The program may comprise a program code for receiving a question from the user. The program may further comprise a program code for extracting a set of keywords from the question based on natural language processing techniques. The program may further comprise a program code for displaying an answer to the question along with metadata associated to the answer. In one aspect, the metadata may be displayed based on a demographic profile pertaining to the user. The program may further comprise a program code for nudging the user with a set of predefined questions based on the demographic profile and the set of keywords. The program may further comprise a program code for analyzing a set of responses received against the set of predefined questions to identify a business opportunity. In one aspect, the set of responses may be analyzed based on the set of keywords and the demographic profile. The program may further comprise a program code for displaying a strategy pertaining to the business opportunity. In one aspect, the strategy may be displayed based on the question, the set of responses, and the demographic profile.

BRIEF DESCRIPTION OF THE DRAWINGS

The foregoing detailed description of embodiments is better understood when read in conjunction with the appended drawing. For the purpose of illustrating the disclosure, there is shown in the present document example constructions of the disclosure; however, the disclosure is not limited to the specific methods and apparatus disclosed in the document and the drawings.

The detailed description is described with reference to the accompanying figure. In the figure, the left-most digit(s) of a reference number identifies the figure in which the reference number first appears. The same numbers are used throughout the drawings to refer like features and components.

DETAILED DESCRIPTION

Figure 1:
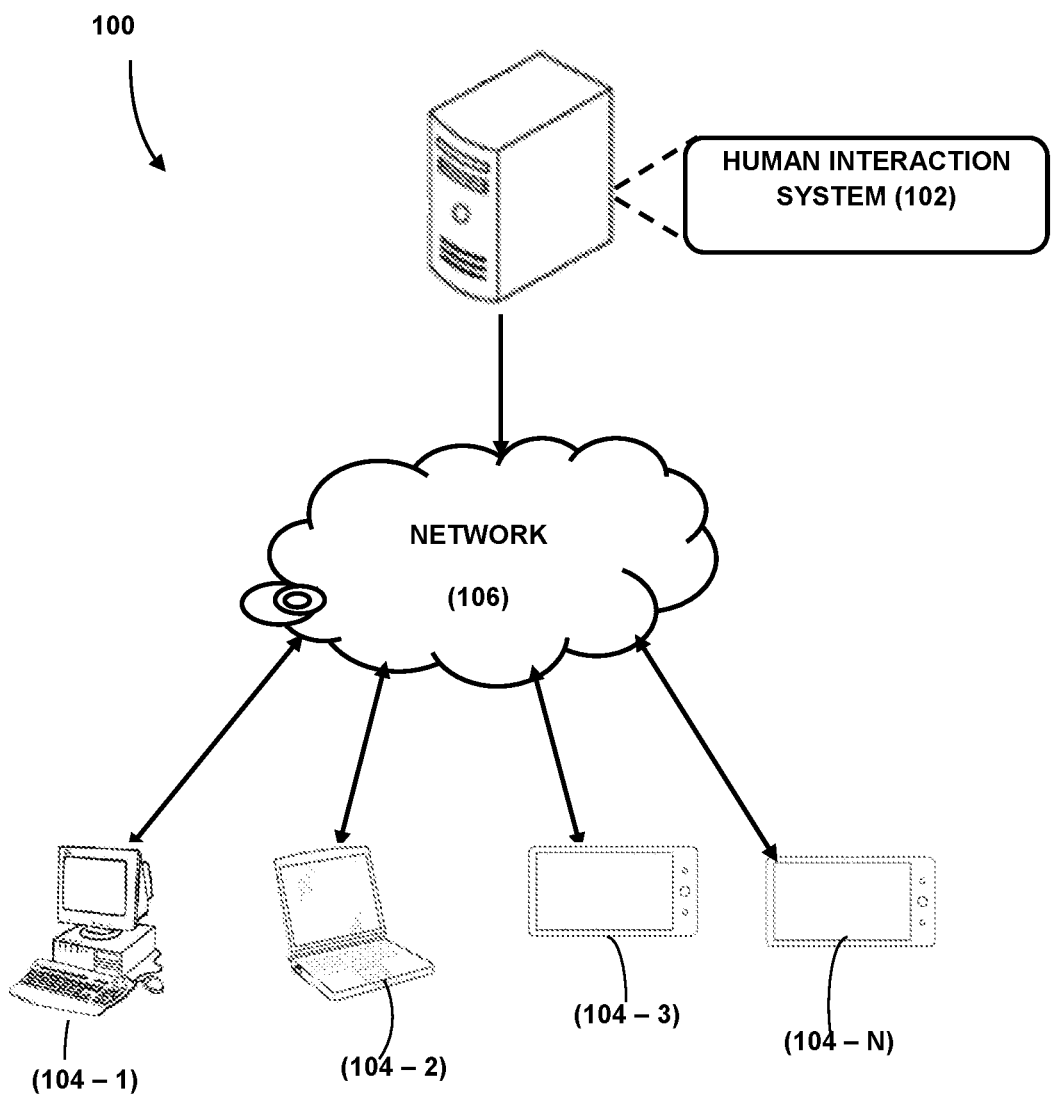
FIG. 1 illustrates a network implementation of a human interaction system, in accordance with an embodiment of the present disclosure.

Some embodiments of this disclosure, illustrating all its features, will now be discussed in detail. The words "receiving", "extracting", "displaying", "nudging", "analyzing", "computing", "selecting", "formulating", "initiating", "terminating", "notifying" "comprising," "having," "containing," and "including," and other forms thereof, are intended to be equivalent in meaning and be open ended in that an item or items following any one of these words is not meant to be an exhaustive listing of such item or items, or meant to be limited to only the listed item or items. It must also be noted that, the singular forms "a," "an," and "the" include plural references unless the context clearly dictates otherwise. Although any apparatuses and methods similar or equivalent to those described herein can be used in the practice or testing of embodiments of the present disclosure, the exemplary, apparatuses and methods are now described. The disclosed embodiments are merely exemplary of the disclosure, which may be embodied in various forms.

The present invention discloses a human interaction system for displaying a strategy, pertaining to a business opportunity, during a conversation with a user. To do so, the human interaction system collaborates with other components in machine and the user to create a man-machine symbiotic system, which allows the user to participate in the cognitive decision-making process while benefiting from automated opportunity analysis provided by the machine. The human interaction system allows the user to participate in the cognitive decision-making process in one of three ways:

a) Goal-Directed Guided Conversation—A goal-directed guided conversation mode of interaction allows the user to seek strategy pertaining to the business opportunity by asking a series of questions. In one implementation, the series of questions may be asked in natural language by speaking to the human interaction system or by entering natural language text. The human interaction system further responds to the user questions by speaking out the answer in a narrative form, displaying a narrative text, and/or rendering interactive knowledge visualizations. The human interaction system considers the series of questions as a conversation which has an implicit goal of resolving the business opportunity. The human interaction system has the intelligence to develop an understanding of the implicit goal during the conversation and thereby generate responses and nudge the user in a goal-directed manner to reach an appropriate resolution of the business opportunity. The goal-directed guided conversation mode of interaction is referred to as ASK persona of the human interaction system.

b) Continuous Observation of Changes—A continuous observation of changes mode of interaction allows the user to periodically observe changes pertaining to a set of predefined parameters associated to the business opportunity through alerts, spoken narratives, and/or the interactive knowledge visualizations. In the continuous observation of changes mode, the user need not have to explicitly ask for information. The changes are brought to the user's attention in real time. In one implementation, the user may subscribe in priori to kinds of changes the user wants to observe and to what depth. The continuous observation of changes mode of interaction is referred to as WATCH persona of the human interaction system.

c) Guided Opportunity Driven Business Optimization—A guided opportunity driven business optimization mode of interaction allows the user to arrive at the strategy by using the cognitive decision-making process methodology (SEAL) in a man-machine symbiotic manner. Meaningful business opportunities which would otherwise remain hidden or surface up too late are automatically notified by the human interaction system in time to the user. The user may select a revealed opportunity and follow a guided process of exploration and strategy development to eventually arrive at a best action guidance to address the revealed business opportunity. The actionable guidance is then disseminated to implementers of actions. The guided opportunity driven business optimization mode of interaction is referred to as DECIDE persona of the human interaction system.

In one aspect, the human interaction system consists of a human interaction server module and a human interaction client module. It may be understood that, every component of the human interaction module has two parts—a front end part which executes in a browser or a mobile application and a back-end part which executes on a server.

In another aspect, the human interaction server module interacts with other modules via the messaging service whereas the front-end part of the human interaction client module interacts with the user. It must be noted that a user action (mouse click, text, and voice) on the front-end result into a request to the backend. The backend part responds to the request either by forming a response by itself or by getting information from other modules by exchanging messages.

Various modifications to the embodiment will be readily apparent to those skilled in the art and the generic principles herein may be applied to other embodiments. However, one of ordinary skill in the art will readily recognize that the present disclosure is not intended to be limited to the embodiments illustrated, but is to be accorded the widest scope consistent with the principles and features described herein.

Referring now to FIG. 1, a network implementation 100 of a human interaction system 102 displaying a strategy, pertaining to a business opportunity, during a conversation with a user is disclosed. In order to display the strategy, initially, the human interaction system 102 may receive a question from a user. Subsequent to receiving the question, the human interaction system 102 may extract a set of keywords from the question based on natural language processing techniques. Upon extracting, the human interaction system 102 may display an answer to the question along with metadata associated to the answer. In one aspect, the metadata may be displayed based on a demographic profile pertaining to the user. Further, the human interaction system 102 may nudge the user with a set of predefined questions based on the demographic profile and the set of keywords. Subsequently, the human interaction system 102 may analyze a set of responses received against the set of predefined questions to identify a business opportunity. In one aspect, the set of responses may be analyzed based on the set of keywords and the demographic profile. In addition, the human interaction system 102 may display a strategy pertaining to the business opportunity. In one aspect, the strategy may be displayed based on the question, the set of responses, and the demographic profile.

Although the present disclosure is explained considering that the human interaction system 102 is implemented on a server, it may be understood that the human interaction system 102 may be implemented in a variety of computing systems, such as a laptop computer, a desktop computer, a notebook, a workstation, a mainframe computer, a server, a network server, a cloud-based computing environment. It will be understood that the human interaction system 102 may be accessed by multiple users through one or more user devices 104-1, 104-2 . . . 104-N, collectively referred to as user 104 or stakeholders, hereinafter, or applications residing on the user devices 104. In one implementation, the human interaction system 102 may comprise the cloud-based computing environment in which a user may operate individual computing systems configured to execute remotely located applications. Examples of the user devices 104 may include, but are not limited to, a portable computer, a personal digital assistant, a handheld device, and a workstation. The user devices 104 are communicatively coupled to the human interaction system 102 through a network 106.

In one implementation, the network 106 may be a wireless network, a wired network or a combination thereof. The network 106 can be implemented as one of the different types of networks, such as intranet, local area network (LAN), wide area network (WAN), the internet, and the like. The network 106 may either be a dedicated network or a shared network. The shared network represents an association of the different types of networks that use a variety of protocols, for example, Hypertext Transfer Protocol (HTTP), Transmission Control Protocol/Internet Protocol (TCP/IP), Wireless Application Protocol (WAP), and the like, to communicate with one another. Further the network 106 may include a variety of network devices, including routers, bridges, servers, computing devices, storage devices, and the like.

Figure 2:
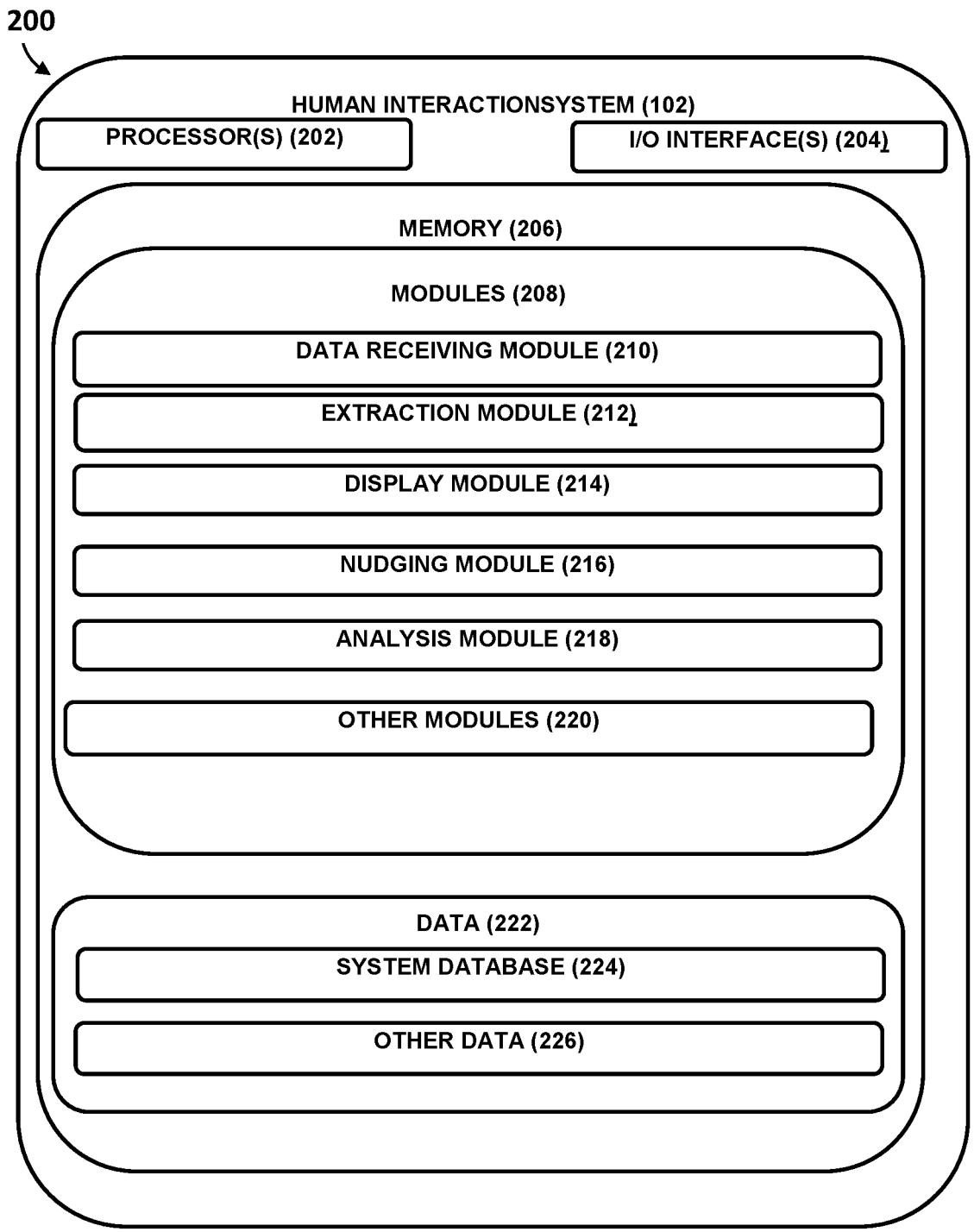
FIG. 2 illustrates the human interaction system, in accordance with an embodiment of the present disclosure.

Referring now to FIG. 2, the human interaction system 102 is illustrated in accordance with an embodiment of the present subject matter. In one embodiment, the human interaction system 102 may include at least one processor 202, an input/output (I/O) interface 204, and a memory 206. The at least one processor 202 may be implemented as one or more microprocessors, microcomputers, microcontrollers, digital signal processors, central processing units, state machines, logic circuitries, and/or any devices that manipulate signals based on operational instructions. Among other capabilities, the at least one processor 202 is configured to fetch and execute computer-readable instructions stored in the memory 206.

The I/O interface 204 may include a variety of software and hardware interfaces, for example, a web interface, a graphical user interface, and the like. The I/O interface 204 may allow the human interaction system 102 to interact with the user directly or through the client devices 104. Further, the I/O interface 204 may enable the human interaction system 102 to communicate with other computing devices, such as web servers and external data servers (not shown). The I/O interface 204 can facilitate multiple communications within a wide variety of networks and protocol types, including wired networks, for example, LAN, cable, etc., and wireless networks, such as WLAN, cellular, or satellite. The I/O interface 204 may include one or more ports for connecting a number of devices to one another or to another server.

The memory 206 may include any computer-readable medium or computer program product known in the art including, for example, volatile memory, such as static random-access memory (SRAM) and dynamic random access memory (DRAM), and/or non-volatile memory, such as read only memory (ROM), erasable programmable ROM, flash memories, hard disks, optical disks, and magnetic tapes. The memory 206 may include modules 208 and data 222.

The modules 208 include routines, programs, objects, components, data structures, etc., which perform particular tasks or implement particular abstract data types. In one implementation, the modules 208 may include a receiving module 210, an extraction module 212, a display module 214, a nudging module 216, and an analysis module 218 and other modules 220. The other modules 220 may include programs or coded instructions that supplement applications and functions of the human interaction system 102. The modules 208 described herein may be implemented as software modules that may be executed in the cloud-based computing environment of the human interaction system 102.

The data 222, amongst other things, serves as a repository for storing data processed, received, and generated by one or more of the modules 208. The data 222 may also include a system database 224 and other data 226. The other data 226 may include data generated as a result of the execution of one or more modules in the other modules 220.

As there are various challenges observed in the existing art, the challenges necessitate the need to build the human interaction system 102 for displaying a strategy, pertaining to a business opportunity, during a conversation with a user. In order to display a strategy, at first, a user may use the client device 104 to access the human interaction system 102 via the I/O interface 204. The user may register them using the I/O interface 204 in order to use the human interaction system 102. In one aspect, the user may access the I/O interface 204 of the human interaction system 102. The human interaction system 102 may employ the receiving module 210, the extraction module 212, the display module 214, the nudging module 216, and the analysis module 218. The detail functioning of the modules is described below with the help of figures.

The present invention displays a strategy pertaining to a business opportunity during a conversation with a user. It may be understood that the conversation between the user and the system is facilitated by using a human interaction client module. The human interaction module may receive a demographic profile of the user. The demographic profile includes, but not limited to, a login credential, a job description of the user, a designation, a location of business pertaining to the user, a business type, a location of the user, and historical data related to the business opportunity. Further, the human interaction client module may allow the user to initiate the conversation with the system upon verifying the login credential pertaining to the user. Upon verifying, initially, the receiving module 210 receives a question from the user. The question may be received as at least one of a voice and a text. In one example, the receiving module 210 may convert the question into the text when the question is received as the voice. The receiving module 210 may further tokenize the text into words by using natural language processing techniques. In one embodiment, the receiving module 210 may initiate a dialogue upon receipt of the question from the user. It may be noted that the dialogue may indicate start of the conversation.

Further to receiving the question, the extraction module 212 extracts a set of keywords from the question based on natural language processing techniques. In one example, the extraction module 212 may extract the set of keywords by using a Rapid Automatic Keyword Extraction (RAKE) algorithm. The set of keywords may be extracted upon identifying key phrases in a body of the question and by analyzing a frequency of word appearance and its co-occurrence with other words in the question. In one aspect, the set of keywords may indicate a feature pertaining to a business opportunity.

In one embodiment, upon extracting the keywords, the extraction module 212 may match the set of keywords with a predefined query pattern pertaining to the business opportunity. Subsequently, the extraction module 212 may formulate a set of query patterns based on the set of keywords and the business opportunity. In one implementation, each keyword, of the set of keywords, may be assigned a predefined weight based on the business opportunity. Further, the extraction module 212 may compute a score pertaining to each query pattern of the set of query patterns. Furthermore, the extraction module 212 may select a query pattern, of the set of query pattern, with highest score amongst the set of query patterns for retrieval of an answer to the question. In addition, the query pattern may be translated as per a syntax of at least one of a system database 224 and other data 226.

Further to retrieval of the answer, the display module 214 displays the answer to the question along with metadata associated to the answer. In one aspect, the metadata may be displayed based on a demographic profile pertaining to the user. The display module 214 may display the answer in at least one of a text, a video, and an interactive knowledge visualization comprising graphs and heat maps. In one implementation, the metadata indicates an answer pertaining to a next probable question to be asked by the user. In one implementation, the next probable question may be augmented based on the set of keywords and the demographic profile. In one embodiment, the display module 214 may select the answer, out of a plurality of answers retrieved by the query pattern, based on the weights associated to each keyword and the demographic profile.

In addition to displaying the answer, the nudging module 216 nudges the user with a set of predefined questions based on the demographic profile and the set of keywords. In one example, the nudging module 216 may nudge the user with a narrative text, a voice message, a video, an interactive knowledge visualization and a like. In one example, the narrative text may be generated by using natural language generation techniques. Subsequent to nudging, the receiving module 210 receives a set of responses against the set of predefined questions from the user.

Upon receiving the set of responses, the analysis module 218 analyzes the set of responses to identify the business opportunity. The analysis module 218 may analyze the set of responses based on the demographic profile and the set of keywords. In one implementation, the analysis module 218 may compute a confidence score associated to each response of the set of responses. The confidence score may be computed based on the set of keywords, and the demographic profile. Further to computing the confidence score, the analysis module 218 may identify the business opportunity based on the confidence score associated to each response.

After identifying the business opportunity, a strategy pertaining to the business opportunity is obtained from an external Opportunity Driven System (ODS). In one example, the strategy indicates a resolution to the business opportunity. Further to obtaining the strategy, the display module 214 displays the strategy as a narrative text, a voice message, a video, an interactive knowledge visualization and the like. The display module 214 may display the strategy based on the question, the set of responses, and the demographic profile. In one embodiment, the display module 214 displays real time information pertaining to a set of predefined parameters related to the business opportunity. The real-time information may indicate changes associated to the set of predefined parameters over a period of time. In one example, the real-time information may be obtained the external ODS. It may be noted that the user may be periodically update the set of predefined parameters.

In an exemplary embodiment, the receiving module 210 terminate the dialogue when a user action pertaining to at least one of the answer and the strategy is not received within a predefined time interval. Example of the user action includes, but not limited to, a text, a mouse click, a gesture input, and a voice command.

Figure 3:
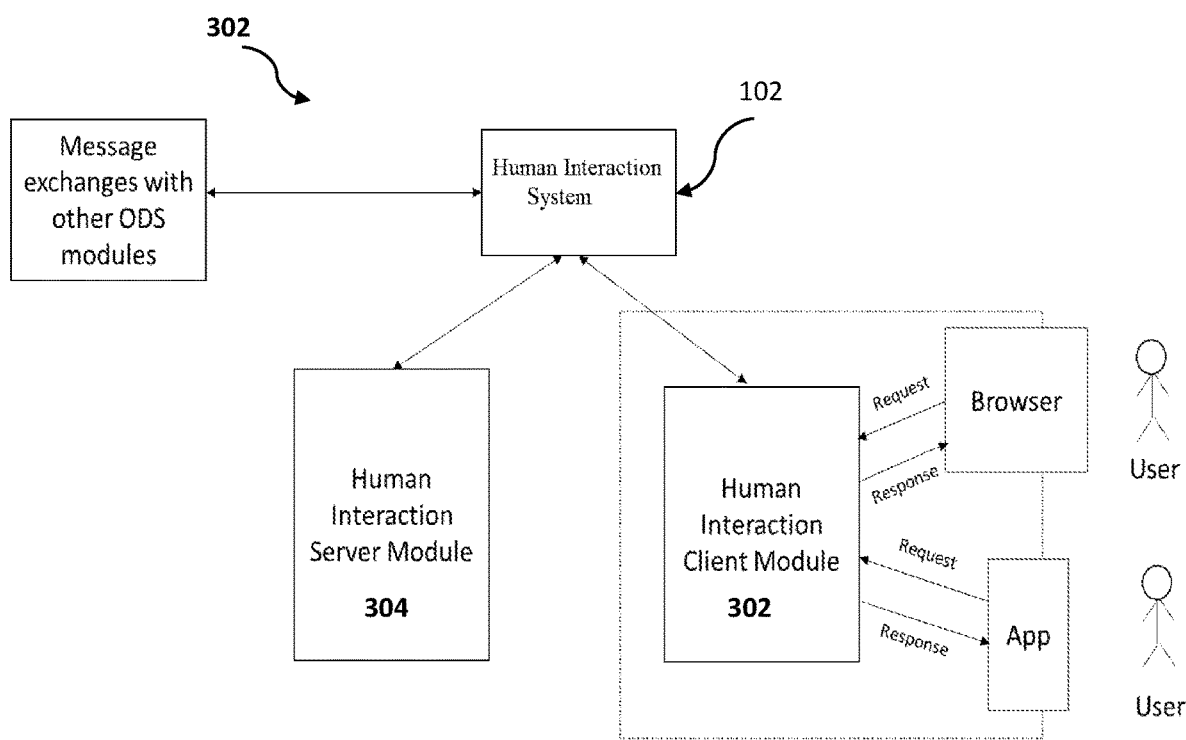
FIG. 3 illustrates a tiered structure of the human interaction system, in accordance with an embodiment of the present disclosure.

Referring now to FIG. 3, a tiered structure 300 of the human interaction system 102 is shown, in accordance with an embodiment of the present disclosure. The human interaction system 102 is connected to one or more external Opportunity Driven Systems (ODS) modules. In one example, there may be one directional interaction where the user action triggers activity in the external ODS modules without necessarily sending a response back to the user. In an alternate example, there may be interactions where the external ODS modules push information to the human interaction system 102 without the user explicitly soliciting it.

In one implementation, the human interaction system 102 comprises a human interaction client module 302 and a human interaction server module 304. The human interaction client module 302 is configured to interact with the user. In order to assist the user in decision making, the human interaction client module 302 receives a request from individual client devices comprising at least one of a mobile application, a web application, and a desktop application. The human interaction client module 210 provides an interface for the users and is responsible for the following activities:

a) Handle user interactions for each of the three personas (ASK, WATCH, and DECIDE), of the human interaction system 102, in a unified user interface based on a demographic profile of the user and their interaction preferences.
  b) Understand user utterances in natural language or gestures and augment and refine these utterances if necessary by using demographic profile and conversation context for the purpose of generating best response. In understanding user, human interaction client module 302 may ask additional clarifying questions from the user.

c) Forwards questions to human interaction system 102 and waits for answers d) Receives responses from human interaction systems 102 and communicates those to users by transforming these to an appropriate form suitable for displaying to the user's device.

The human interaction server module 304 supports the human interaction client module 302 for processing questions which cannot be handled by the human interaction client module 302 by its local intelligence. In doing so, in turn, the human interaction server module 304 uses the services of other modules such as knowledge module in an external Opportunity Driven System (ODS). The human interaction server module 304 is responsible for the following activities:

a) Receive requests originating from human interaction client module 302 in the context of each of the three personas (ASK, WATCH, and DECIDE).

b) Generate responses for requests and forwards those to the human interaction client module 302.

c) Maintain information to be pushed to the user in the WATCH persona, and notify human interaction client module 302, as the user logs in to the human interaction system 102.

d) While the user is still logged in push in real time, changes in information pertaining to observed information in WATCH persona and new opportunities in the DECIDE persona; otherwise save this information for user in later interactions with the user.

e) Initiate actions and collaborate with other modules, for example the external ODS, as needed to formulate a response for the question asked by the user.

In another implementation, the human interaction system 102 is configured to display a strategy, pertaining to a business opportunity, during a conversation with a user. In order to do so, the human interaction system 102 interacts with the user in at least one of the three personas comprising the ASK persona, the WATCH persona and the DECIDE persona. In order to provide ease of use in decision-making process, the user may interact with the human interaction system 102 in one of the three ways (three personas), as illustrated in FIG. 3, stated below, a) ASK—The user may interact with the human interaction system 102 in natural language by asking questions using voice or typing text. The human interaction system 102 responds to the questions by speaking the answers and/or showing text and/or data interactive knowledge visualizations including graphs and heat map.

b) WATCH—The users may opt to be shown certain information in real time without the user having to ask for it explicitly. The information shown may be raw information or further processed by at least one of the human interaction system 102 or the external ODS modules.

c) DECIDE—The decide mode of interaction is for opportunity driven decision making, the decision makers are shown opportunities as they arise and are led through the decision-making process in a methodical way.

In another aspect, the user interaction with the human interaction system 102 is mentioned as below;

a) The human interaction system 102 initiates a dialogue upon detection of a user action (click, type, speak, gesture, touch, or mouse action) in the browser or the application interface of the human interaction client module 302.

b) Browser or application interface part of the human interaction client module 302 analyses the user action. If the human interaction client module 302 is configured to handle the action locally, the human interaction client module 302 responds by rendering and/or speaking out the response, otherwise goes to step (c).

c) Browser or application interface part of the human interaction client module 302 forms a request using a control logic and sends the request to the human interaction system 102.

d) Upon receiving the request, the human interaction system 102 forwards the request to backend part of the human interaction client module 302 which then attempts to produce a response by a local intelligence. If it is configured to handle the request locally, it formulates a response and sends it to browser or application interface, otherwise go to step (e).

e) The human interaction system 102 forms a message to the human interaction server module 304 which may formulate a response by its local intelligence or invoke a pertinent module (the knowledge system) and waits for a response back on a response message queue.

f) Upon receiving the response back to the request in step (e), the human interaction system 102 processes the response and in turn sends it to the browser or the application interface, the front-end part of the human interaction client module 302.

g) Browser or application interface, after receiving the response in step (d) or step (f), displays the response in the interface for the consumption of the user.

In order to elucidate further, consider an example of ASK persona for displaying a strategy to a Chief Financial Officer (CFO) of a multinational organization, in accordance with an embodiment of the present subject matter. To do so, initially, CFO interact with the human interaction system 102 via the human interaction client module 302. The human interaction module 302 includes a mobile application, a desktop application, a web application, and others. Further, the human interaction system 102 requests login information to CFO by using the human interaction client module 302. It may be understood that the login information comprises a user name and a password. Upon receipt of the login information, the human interaction system 102 verifies the login information from the system database 224. Upon verification, the human interaction system 102 allows access to the human interaction client module 302. It may be noted that after allowing access to CFO, the human interaction system 102 fetches demographic profile pertaining to CFO. The demographic profile comprises location of CFO, business type, company name, designation, Key Responsible Areas (KRAs) and others. In one implementation, CFO is in-charge of 3 inventories A, B and C that are located at different locations.

After allowing the access, the human interaction server module 304 initiates a dialogue indicating start of the conversation. Upon initiating the dialogue, CFO asks the human interaction client module 302 about "What is the excess stock?" It is to be noted that the question received by the human interaction client module 302 is incomplete as specific details pertaining to the question is not provided by CFO. In this situation, the human interaction client module 302 transmits the question to the human interaction system 102 to provide the answer. Upon receipt of the question, the human interaction system 102 synthesizes the question and extracts a set of keywords from the question by using the natural language processing techniques. The set of keywords are "excess" and "stock". As the question is incomplete, the human interaction module augments the question based on the demographic profile and obtains information about excess stock pertaining to all three inventories under the charge of CFO. In one implementation, the information is obtained from the external ODS. Further, the human interaction system 102 retrieves metadata for "excess stock at inventory A", "excess stock at inventory B", and "excess stock at inventory C".

Upon receiving the information, the human interaction system 102 sends the information to the human interaction client module 302. Upon receiving, the human interaction client module 302 displays the information about the "excess stock" along with the metadata pertaining to the "excess stock at inventory A", "excess stock at inventory B", and "excess stock at inventory C". Further, the human interaction client module 302 nudges CFO with a set of predefined questions. The predefined questions are in the form of "do you know?", "you may also like to know", "Have you seen this?". In this example, the set of predefined questions comprise "do you know, what is the value of the items at inventory A?", "have you seen the losses incurred at inventory B?" and others. Furthermore, a set of responses against the set of predefined questions is received by the human interaction client module 302. In one implementation, CFO responds only to one question out of the set of predefined questions. The response to "have you seen the losses incurred at inventory B?" is received as "NO" by the human interaction client module 302. Thus, confidence score pertaining to "NO" is the highest as no other response is received. In addition, the human interaction server module 304 analyses the response of CFO and augments that "losses incurred at inventory B" is a business opportunity as per the demographic profile, the set of keywords and the confidence score.

Upon analyzing the business opportunity, the human interaction server module 304 formulates a set of query patterns based on the set of keywords and the business opportunity. Further, a query pattern with highest score is selected for retrieval of a strategy corresponding to the business opportunity. After selecting the query pattern, the query pattern is translated into one or more forms as per syntax associated to one or more external ODS used for retrieving the strategy. In an alternate embodiment, when one or more strategies pertaining to the query is retrieved, a strategy is selected in a manner such that the confidence score pertaining to the strategy is highest amongst the one or more strategies. It may be noted that the confidence score pertaining to the one or more strategies is computed based on the set of keywords, the demographic profile and the business opportunity.

Upon retrieving the strategy, the human interaction client module 302 displays the strategy in a video, a narrative text, an interactive knowledge visualizations and others. Further to displaying the strategy, the demographic profile is updated based on the strategy and the context of the dialogue. Furthermore, the human interaction client module 302 terminates the dialogue when CFO does not interact with the human interaction client module 302 for a period of 10 minutes. It may be understood that CFO may interact with the human interaction client module 302 by using a touch, a mouse click, a gesture input, a voice command, and others.

In another example, consider an example of WATCH persona, in accordance with an embodiment of the present subject matter. In WATCH persona, the human interaction system 102 is configured to display change in a set of predefined parameters pertaining to a user. Thus, in this example, CFO updates the set of predefined parameters as "price of stock", "weather report", "price of fuel" and others. In order to assist the CFO, the human interaction client module 302 notifies CFO for any change in at least one of a "price of stock", "weather report", and "price of fuel". In one implementation, the human interaction client module 302 may notify at a specific time as per the instructions received from CFO. For example, CFO may set the time to notify daily at 10 AM. Thus, the human interaction client module 302 notifies CFO about the change in "price of stock", "weather report", and "price of fuel" daily at 10 AM. It may be understood that responses to the set of predefined parameters may be retrieved from at least one of the human interaction server module 304 and the external ODS.

Figure 4:
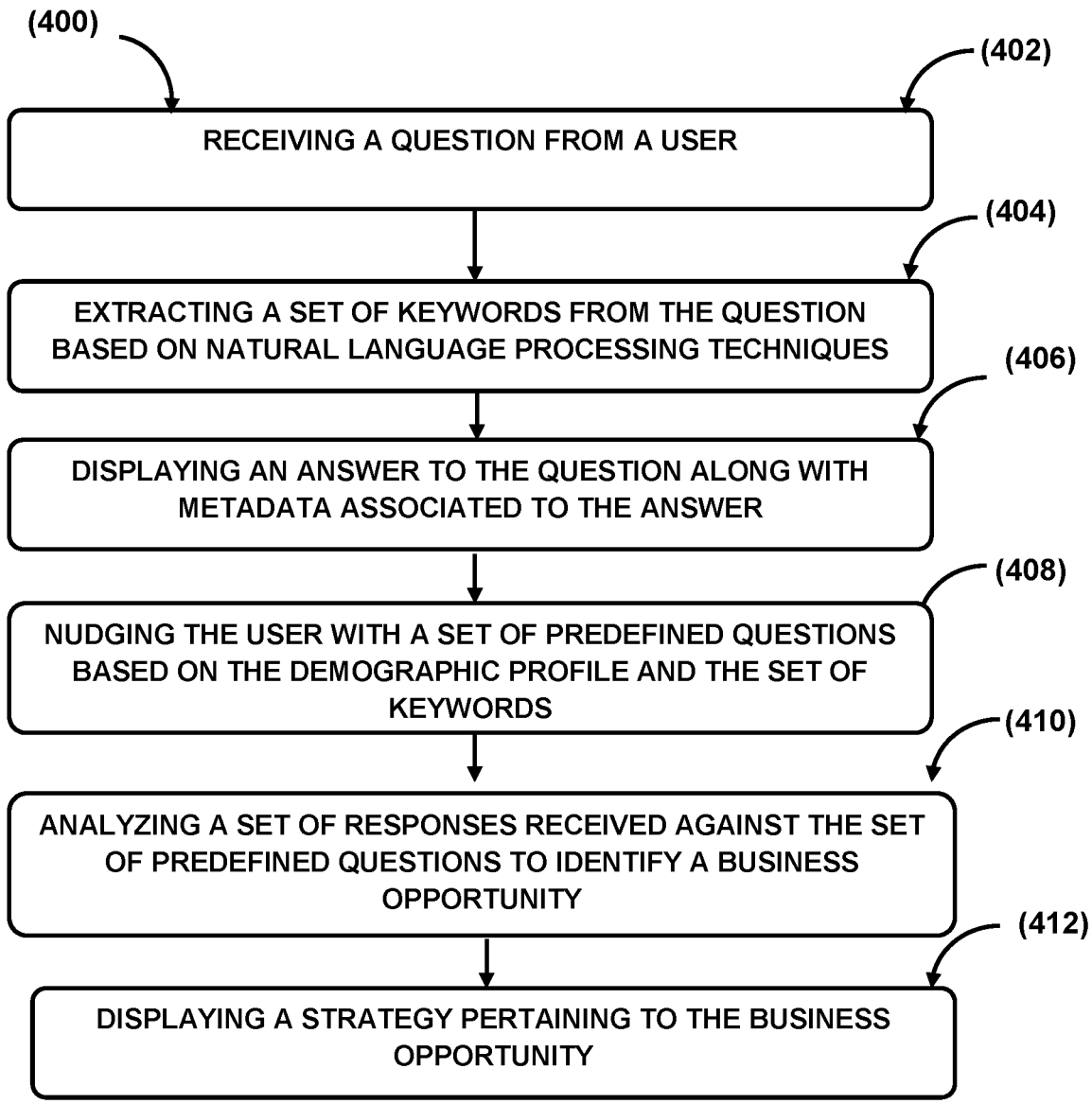
FIG. 4 illustrates a method for displaying a strategy, pertaining to a business opportunity, during a conversation with a user, in accordance with an embodiment of the present subject matter.

Referring now to FIG. 4, a method 400 for displaying a strategy, pertaining to a business opportunity, during a conversation with a user is shown, in accordance with an embodiment of the present subject matter. The method 400 may be described in the general context of computer executable instructions. Generally, computer executable instructions can include routines, programs, objects, components, data structures, procedures, modules, functions, etc., that perform particular functions or implement particular abstract data types. The method 400 may also be practiced in a distributed computing environment where functions are performed by remote processing devices that are linked through a communications network. In a distributed computing environment, computer executable instructions may be located in both local and remote computer storage media, including memory storage devices.

The order in which the method 400 is described is not intended to be construed as a limitation, and any number of the described method blocks can be combined in any order to implement the method 400 or alternate methods. Additionally, individual blocks may be deleted from the method 400 without departing from the spirit and scope of the subject matter described herein. Furthermore, the method can be implemented in any suitable hardware, software, firmware, or combination thereof. However, for ease of explanation, in the embodiments described below, the method 400 may be considered to be implemented as described in the system 102.

At block 402, a question from a user may be received. In one implementation, the question from a user may be received by a receiving module 210.

At block 404, a set of keywords may be extracted from the question based on natural language processing techniques. In one implementation, the set of keywords from the question may be extracted based on natural language processing techniques by an extraction module 212.

At block 406, an answer to the question may be displayed along with metadata associated to the answer. In one aspect, the metadata may be displayed based on a demographic profile pertaining to the user. In one implementation, the answer to the question may be displayed along with metadata associated to the answer by a display module 214.

At block 408, the user may be nudged with a set of predefined questions based on the demographic profile and the set of keywords. In one implementation, the user may be nudged with a set of predefined questions by a nudging module 216.

At block 410, a set of responses received against the set of predefined questions may be analyzed to identify a business opportunity. In one aspect, the set of responses may be analyzed based on the set of keywords and the demographic profile. In one implementation, a set of responses received against the set of predefined questions may be analyzed by an analysis module 218.

At block 412, a strategy pertaining to the business opportunity may be displayed. In one aspect, the strategy may be displayed based on the question, the set of responses, and the demographic profile. In one implementation, a strategy pertaining to the business opportunity may be displayed by the display module 214.

Exemplary embodiments discussed above may provide certain advantages. Though not required to practice aspects of the disclosure, these advantages may include those provided by the following features.

Some embodiments enable a system and a method to assist a user in decision making pertaining to a business opportunity.

Some embodiments enable a system and a method to suggest a strategy pertaining to a business opportunity.

Some embodiments enable a system and a method to augment the business opportunity based on series of questions asked by the user.

Some embodiments enable a system and a method to instantaneously update the risk associated with the business opportunity.

Although implementations for methods and systems displaying a strategy, pertaining to a business opportunity, during a conversation with a user have been described in language specific to structural features and/or methods, it is to be understood that the appended claims are not necessarily limited to the specific features or methods described. Rather, the specific features and methods are disclosed as examples of implementations for displaying a strategy, pertaining to a business opportunity, during a conversation with a user.

The invention claimed is:

1. A method for displaying a strategy, pertaining to an opportunity, during a conversation with a user, the method comprising:
    receiving, by a processor, a question from a user, wherein the question is either an incomplete question or a complete question;
    extracting, by the processor, a set of keywords from the question based on natural language processing techniques, wherein the set of keywords are extracted using a Rapid Automatic Keyword Extraction (RAKE) algorithm;
    augmenting, by the processor, the question based on the set of keywords and a demographic profile pertaining to the user, wherein the question is augmented when the question is the incomplete question;
    displaying, by the processor, an answer to the question along with metadata associated to the answer, wherein the metadata is displayed based on the demographic profile pertaining to the user;
    nudging, by the processor, the user, during a cognitive decision-making process, with a set of predefined questions, adding additional clarification, based on the demographic profile and the set of keywords, wherein the cognitive decision-making process allows the user to participate in the decision-making process by responding to the set of predefined questions in real time;
    analyzing, by the processor, a set of responses received against the set of predefined questions to identify an opportunity, wherein the set of responses is analyzed based on the set of keywords and the demographic profile;
    formulating, by the processor, a set of query patterns based on the set of keywords and the opportunity, wherein each query pattern of the set of query patterns is formulated post matching the set of keywords to a predefined query pattern;
    computing, by the processor, a score pertaining to each query pattern of the set of query patterns, wherein the score is based on a predefined weight associated to each keyword of the set of keywords;
    selecting, by the processor, a query pattern of the set of query patterns, with a highest score amongst the set of query patterns for retrieval of answers to the predefined questions and a strategy pertaining to the opportunity; and
    displaying, by the processor, the strategy pertaining to the opportunity, wherein the strategy is displayed based on the question, the set of responses, and the demographic profile.

2. The method of claim 1, wherein the demographic profile comprises at least one of a job description of the user, a designation, a location of business pertaining to the user, a business type, a location of the user, and historical data related to the opportunity.

3. The method of claim 1, wherein the opportunity is identified upon computing a confidence score associated to each response of the set of responses, and wherein the confidence score is computed based on the set of keywords, and the demographic profile.

4. The method of claim 1, wherein the question is received in at least one of a voice, and a text.

5. The method of claim 1, wherein the answer and the metadata is displayed in at least a text, and an interactive knowledge visualization.

6. The method of claim 1 further comprises initiating a dialogue upon receipt of the question from the user, wherein the dialogue indicates start of a conversation; and
    terminating the dialogue when a user action pertaining to at least one of the answer and the strategy is not received within a predefined time interval, wherein the user action comprises at least one of a text, a mouse click, a gesture input, and a voice command.

7. The method of claim 1 further comprises displaying real time information pertaining to a set of predefined parameters related to the opportunity, wherein the set of predefined parameters are updated periodically by the user.

8. The method of claim 1, wherein the user is allowed to participate in the cognitive decision-making process in one of a Goal-Directed Guided Conversation, a Continuous Observation of Changes, and a Guided Opportunity Driven Business Optimization.

9. A system for displaying a strategy, pertaining to an opportunity, during a conversation with a user, the system comprising:
    a processor; and
    a memory coupled to the processor, wherein the processor is capable of executing a plurality of modules stored in the memory, and wherein the plurality of modules comprising:
    a receiving module for receiving a question from a user, wherein the question is either an incomplete question or a complete question;
    an extraction module for
        extracting a set of keywords from the question based on natural language processing techniques, wherein the set of keywords are extracted using a Rapid Automatic Keyword Extraction (RAKE) algorithm; and augmenting the question based on the set of keywords and a demographic profile pertaining to the user, wherein the question is augmented when the question is the incomplete question;

a display module for displaying an answer to the question along with metadata associated to the answer, wherein the metadata is displayed based on the demographic profile pertaining to the user;

a nudging module for nudging the user, during a cognitive decision-making process, with a set of predefined questions, adding additional clarification, based on the demographic profile and the set of keywords, wherein the cognitive decision-making process allows the user to participate in the decision-making process by responding to the set of predefined questions in real time;

an analysis module for
analyzing a set of responses received against the set of predefined questions to identify an opportunity, wherein the set of responses is analyzed based on the set of keywords and the demographic profile;

formulating a set of query patterns based on the set of keywords and the opportunity, wherein each query pattern of the set of query patterns is formulated post matching the set of keywords to a predefined query pattern;

computing a score pertaining to each query pattern of the set of query patterns, wherein the score is based on a predefined weight associated to each keyword of the set of keywords;

selecting a query pattern of the set of query patterns, with a highest score amongst the set of query patterns for retrieval of answers to the predefined questions and a strategy pertaining to the opportunity; and the display module for displaying the strategy pertaining to the opportunity, wherein the strategy is displayed based on the question, the set of responses, and the demographic profile.

10. The system of claim 9, wherein the demographic profile comprises at least one of a job description of the user, a designation, a location of business pertaining to the user, a business type, a location of the user, and historical data related to the opportunity.

11. The system of claim 9, wherein the opportunity is identified upon computing a confidence score associated to each response of the set of responses, and wherein the confidence score is computed based on the set of keywords, and the demographic profile.

12. The system of claim 9, wherein the question is received in at least one of a voice, and a text.

13. The system of claim 9, wherein the answer and the metadata is displayed in at least a text, and an interactive knowledge visualization.

14. The system of claim 9 is further configured to
initiate a dialogue upon receipt of the question from the user, wherein the dialogue indicates start of a conversation; and
terminate the dialogue when a user action pertaining to at least one of the answer and the strategy is not received within a predefined time interval, wherein the user action comprises at least one of a text, a mouse click, a gesture input, and a voice command.

15. The system of claim 9 is further configured to display real time information pertaining to a set of predefined parameters related to the opportunity, wherein the set of predefined parameters are updated periodically by the user.

16. A non-transitory computer readable medium embodying a program executable in a computing device for displaying a strategy, pertaining to an opportunity, during a conversation with a user, the program comprising a program code:

a program code for receiving a question from a user, wherein the question is either an incomplete question or a complete question;

a program code for extracting a set of keywords from the question based on natural language processing techniques, wherein the set of keywords are extracted using a Rapid Automatic Keyword Extraction (RAKE) algorithm;

a program code for augmenting the question based on the set of keywords and a demographic profile pertaining to the user, wherein the question is augmented when the question is the incomplete question;

a program code displaying an answer to the question along with metadata associated to the answer, wherein the metadata is displayed based on the based on a demographic profile pertaining to the user;

a program code for nudging the user, during a cognitive decision-making process, with a set of predefined questions, adding additional clarification, based on the demographic profile and the set of keywords, wherein the cognitive decision-making process allows the user to participate in the decision-making process by responding to the set of predefined questions in real time;

a program code for analyzing a set of responses received against the set of predefined questions to identify an opportunity, wherein the set of responses is analyzed based on the set of keywords and the demographic profile;

a program code for formulating a set of query patterns based on the set of keywords and the opportunity, wherein each query pattern of the set of query patterns is formulated post matching the set of keywords to a predefined query pattern;

a program code for computing a score pertaining to each query pattern of the set of query patterns, wherein the score is based on a predefined weight associated to each keyword of the set of keywords;

a program code for selecting a query pattern of the set of query patterns, with a highest score amongst the set of query patterns for retrieval of answers to the predefined questions and a strategy pertaining to the opportunity; and a program code for displaying the strategy pertaining to the opportunity, wherein the strategy is displayed based on the question, the set of responses, and the demographic profile.

17. The system of claim 9, wherein the user is allowed to participate in the cognitive decision-making process in one of a Goal-Directed Guided Conversation, a Continuous Observation of Changes, and a Guided Opportunity Driven Business Optimization.

* * * * *